Oct. 17, 1961  O. H. BANKER  3,004,435
OVER CONTROL LINKAGE FOR GOVERNOR
Filed Oct. 22, 1959  2 Sheets-Sheet 1
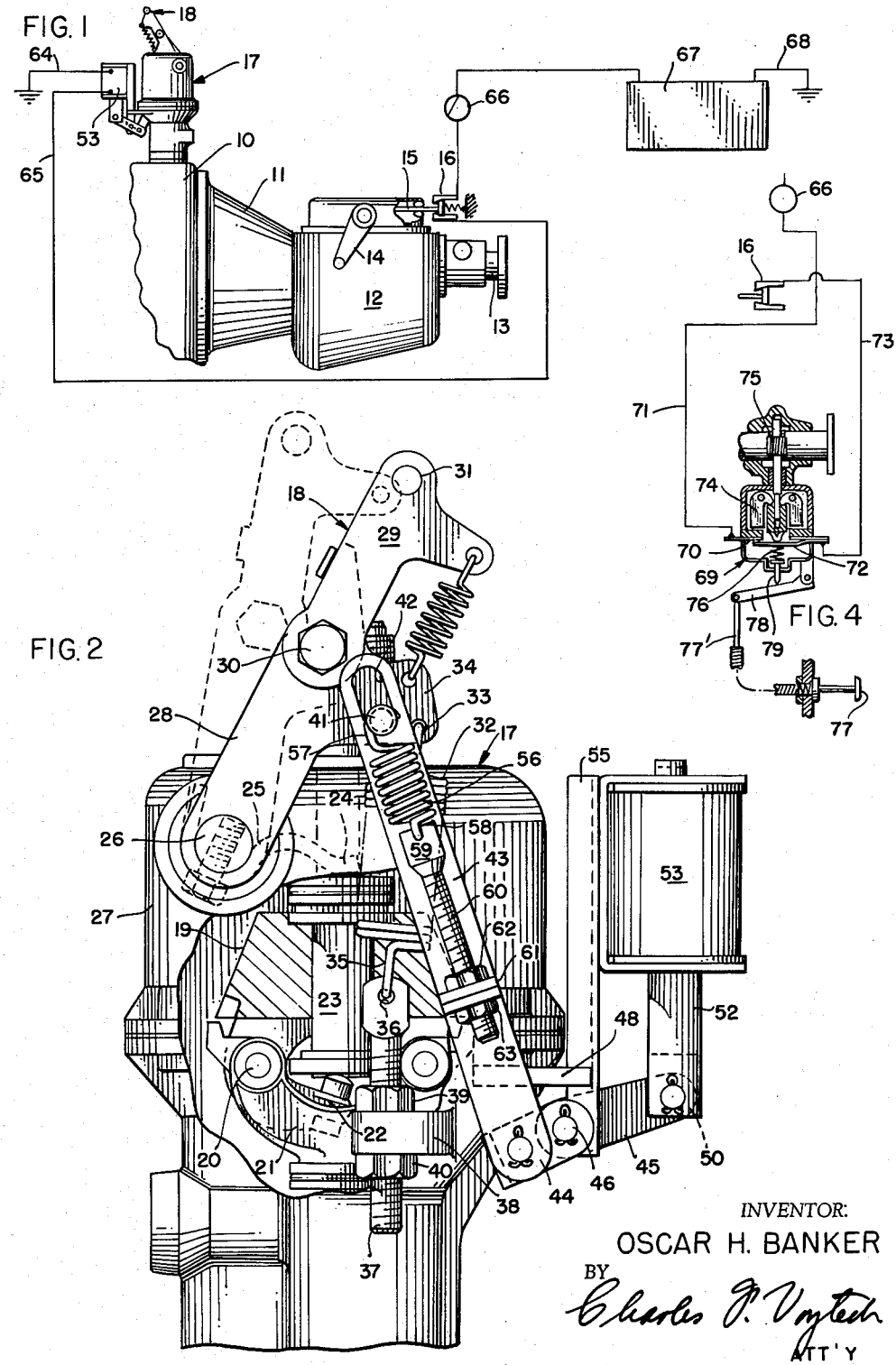
INVENTOR:
OSCAR H. BANKER
BY
Charles P. Vojtech
ATT'Y

INVENTOR:
OSCAR H. BANKER

United States Patent Office 3,004,435
Patented Oct. 17, 1961

3,004,435
OVER CONTROL LINKAGE FOR GOVERNOR
Oscar H. Banker, Evanston, Ill., assignor, by mesne assignments, to Fawick Corporation, Cleveland, Ohio, a corporation of Michigan
Filed Oct. 22, 1959, Ser. No. 848,070
2 Claims. (Cl. 73—543)

This invention relates to governor mechanisms for the engines of automotive vehicles, and particularly to a governor mechanism for the engines of trucks, busses or the like.

Heavily loaded vehicles require maximum engine power for accelerating them from a standing start to the speed at which the most economical gear ratio for the change speed transmission associated with the vehicle engine can be used. After the desired speed ratio is attained in the transmission considerably less power is required to keep the vehicle moving at cruising or road speed. The availability of the reserve power, however, is a temptation to drivers of the vehicles to overspeed while crusing so that more time can be available to them at food, rest or refueling stops. The desired road speed recommended by the owner or lessee of a commercial motor vehicle is usually that which provides the maximum fuel economy consistent with rapid completion of a shipment and which results in the least wear or damage to the vehicle and its cargo. Upward deviations from this desired speed therefore result in fuel waste as well as in more frequent repairs to the vehicle and, on occasion, damage to the cargo.

It has been proposed to govern the speed of an engine of an automotive vehicle by controlling the engine from the output shaft of the transmission. This, however, entails a rather long mechanical linkage between the output of a transmission and the fuel feed control device for the engine. It has also been proposed to control the speed of the engine by a governor driven directly by the engine shaft, or by some element rotating in timed relation therewith. In this latter arrangement, however, full power is not available for accelerating the vehicle from a standing start to its road speed since the engine is never allowed to turn over at its maximum speed.

It is accordingly an object of this invention to provide a governor for the engine of an automotive vehicle which will permit the engine to rotate at its maximum speed and develop its maximum power for accelerating the vehicle from a standing start to its cruising speed range, but once the cruising speed range is attained, will prevent the engine from developing its maximum power and, instead, will hold the engine to a predetermined upper speed.

As a more specific object, this invention has within its purview the provision of a readily obtainable governor mechanism for the engine of a road vehicle wherein the governor is driven in timed relation with the rotation of the crankshaft of the engine, but wherein means are provided, under the control of the shift mechanism of a change speed transmission driven from the engine into its high or cruising speed range, for limiting the maximum speed of the engine.

As a still more specific object, this invention seeks to provide a mechanical governor driven from the engine of an automotive vehicle and adapted to control the fuel feeding system for the engine, said governor having additional restraining means thereon tending to restrain its governing action, with means controlled by an element of the change speed transmission driven from the engine for rendering the additional restraining means ineffective to perform its function.

Among the specific objects of this invention are also the provision of a governing mechanism for an engine of an automotive vehicle which will be inexpensive to make and install, which will be very simple to adjust and which will be reliable in its operation.

These and other objects of this invention will become apparent from the following detailed description of the invention when taken together with the accompanying drawings in which:

FIG. 1 is a side elevational view of a fragment of an engine and its change speed transmission showing how the governor incorporating the present invention may be installed thereon;

FIG. 2 is an enlarged side elevational view of the governor mechanism of FIG. 1 and of the novel additional controls therefor;

FIG. 4 is a schematic diagram of a modification of the control shown in FIG. 2.

Figure 3:
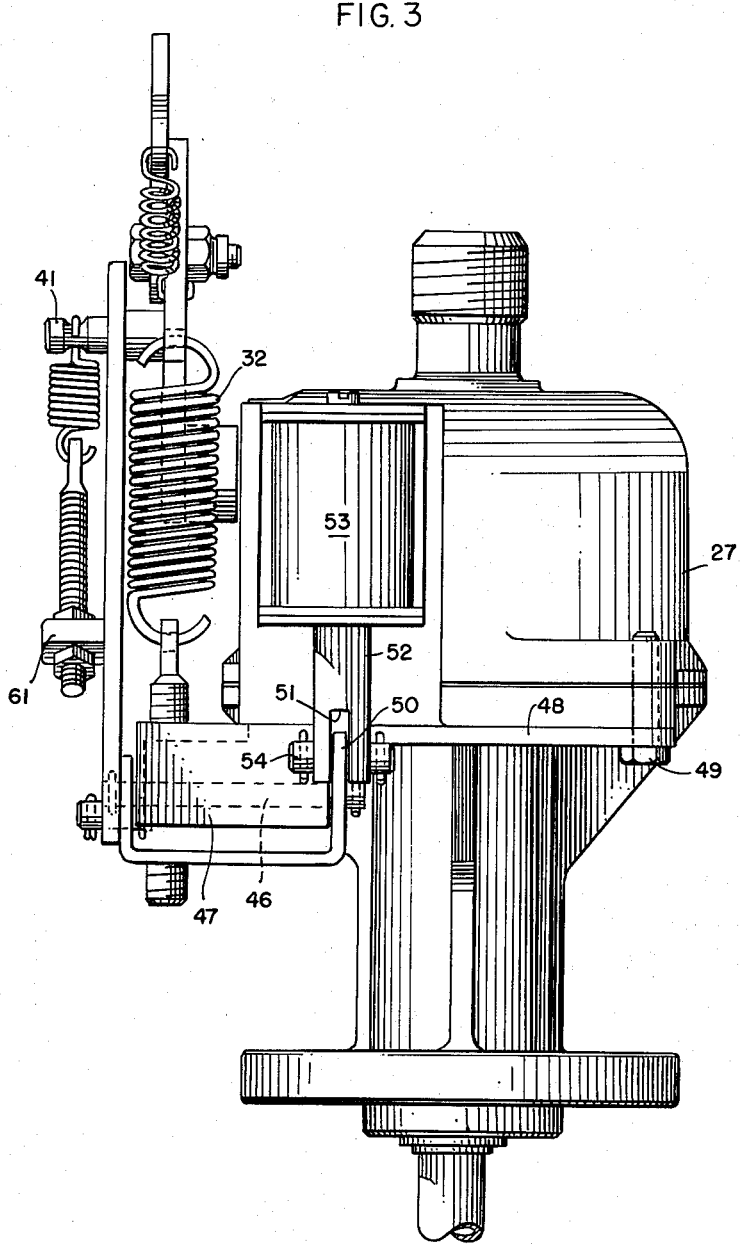
FIG. 3 is a side elevational view of the governor mechanism of FIG. 2 looking from right to left in FIG. 2.

In the description which follows, the most economical form of the governor mechanism of this invention has been selected to illustrate the principles thereof. It may be understood that other forms may also be used without departing from the spirit of this invention.

Adverting now to FIG. 1 for a general description of the invention there is shown the rear portion of an engine 10 to which is bolted a housing 11 which encloses the clutch or other releasable driving connection between the engine and rear wheels normally found in commercial automotive vehicles. A change speed transmission 12 (shown only in outline) driven from the output element of the clutch (not shown) in housing 11 has an output shaft 13 to which the propeller shaft (not shown) of the vehicle is connected to transmit the drive from the change speed transmission to the rear wheels of the vehicle.

It may be understood that in accordance with the usual practice in connection with transmissions for heavy road vehicles, change speed transmission 12 may be adapted to provide a plurality of forward speeds, each shift into a different speed being accomplished by connecting or disconnecting certain clutch elements in the transmission (not shown), said shiftable clutch elements in turn being controlled by shift rails manipulated by an external lever 14, the end of which is connected to a suitable control lever (not shown) mounted in the cab of the vehicle within easy reach of the driver. The specific form of transmission 12 is not material to the operation of this invention, it only being necessary that the transmission, in whatever form, will have a shift element which is associated with a change in speed ratio through the transmission to the highest speed available, that is, to that speed ratio used to propel the vehicle while it is cruising along the highway. Thus, transmission 12 may be a planetary transmission having clutches and brake bands for effecting shifts in speed ratio therethrough in accordance with known designs, the clutches and brakes being operated hydraulically or mechanically or electrically as desired. Alternatively, transmission 12 may be of the countershaft type utilizing clutches and shift rails and yokes for controlling the shift collars of the clutches.

For purposes of illustration there is shown in a cut-away portion of the transmission 12 a portion of a shift rail 15, one end of which extends through the housing for the transmission 12 and actuates a switch 16 (shown in outline) mounted on said housing in the vicinity of the shift rail 15. Alternatively, switch 16 may be actuated by hydraulic pressure in a conduit of a hydraulically controlled change speed transmission which is pressurized only when a shift is effected into road speed, the hydraulic pressure in the conduit being controlled for example by a hydraulic governor for the purpose of controlling the function of brakes and clutches in a planetary transmission in accordance with known design.

The mechanical governor 17 is shown in FIG. 1 mounted on the rear portion 10 of the engine, said governor mechanism being driven either by the crankshaft or by any element rotating in timed relation therewith such as a valve camshaft, a distributor shaft or the shaft which controls the fuel injection of a diesel form of fuel feeding device. Said governor mechanism 17 has a lever 18 mounted thereon, the upper end of which may be connected to the fuel regulating device by which the speed of the engine is controlled. Said lever 18 is connected by a mechanism, hereinafter to be described, to the governor mechanism in such manner as to cause the governor mechanism to restrict the amount of fuel introduced into the engine when the speed thereof tends to exceed a predetermined maximum value after the vehicle driven by the engine reaches its cruising speed.

It is contemplated, in accordance with this invention, that governor mechanism 17 will not interfere with the normal functioning of engine 10 while the vehicle is at rest, nor while the vehicle is accelerating from a standing start to its cruising speed range. After a shift has been made in transmission 12 by the shift rail 15 into the cruising speed ratio, electromagnetic means controlled by switch 16 operated by shift rail 15 comes into play to reduce the resistance of the governor weight return springs so that the governor mechanism 17 will become effective at a lower engine speed to reduce the fuel intake to the engine and thereby prevent the engine from exceeding a predetermined rotational speed.

The specific means used to accomplish the foregoing objective is shown more clearly in FIGS. 2 and 3. Referring first to FIG. 2, the governor mechanism is comprised of a plurality of weights 19 pivoted at 20 on an axially fixed bracket 21 driven in timed relation with the engine crankshaft by some suitable means (not shown). Governor weights 19 are L-shaped and have inwardly extending fingers 22 which contact an axially slidable sleeve 23, the latter transmitting the axial component of the movement of the inwardly extending fingers 22 to the inner end 24 of a stamped bar 25 secured to rotate with a rock shaft 26 mounted for such rocking movement on the housing 27 of the governor mechanism 17.

Rock shaft 26 extends through housing 27 to the exterior thereof, the outer end of the shaft being secured to an arm 28 extending upwardly from the shaft 26. Said arm 28 has a second arm 29 pivotally mounted thereon at 30, the upper end 31 of arm 29 being connected through suitable linkage (not shown) to the carburetor or other fuel controlling device of the engine 10. It is contemplated that rotation of arm 28 in a counterclockwise direction as viewed in FIG. 2, will decrease the maximum amount of fuel being admitted to the engine and that rotation of the arm in the opposite direction will increase the maximum amount of fuel being admitted to the engine. It is understood that manual control of the fuel feeding device independently of the movement of arm 28 within the limits set by said arm is made possible by an independent linkage of known design which likewise is not shown.

Resistance to outward movement of weights 19 under the influence of centrifugal force is restrained by a return spring 32 one end 33 of which is connected to arm 28 at 34 and the other end 35 of which is hooked into an opening 36 in the head of a screw 37 passing through an ear 38 on housing 27 and adjustably locked thereto by a pair of lock nuts 39, 40 disposed on opposite sides of ear 38. Thus, the tension in spring 32 may be varied by locking the bolt 37 in a position which is higher or lower with respect to the ear 38. The tension in spring 32 is transmitted through arm 28 to shaft 26 and thence through the stamped bar 25 to the sleeve 23 and the fingers 22 of the governor weights 19.

It is contemplated that inasmuch as spring 32 is relatively light, the movement of the weights 19 outwardly under centrifugal force will therefore encounter correspondingly less restraint, and consequently, movement of the arm 28 to the position corresponding to the closed position of the throttle will be effected at a lower engine speed. Thus, spring 32 constitutes the sole restraining force for the governor weights during the cruising speed operation of the truck which is the condition at which limitations upon the speed of the vehicle are to be imposed. Higher speed operation of the engine for acceleration purposes is made possible by introducing an additional resistance to the movement of the arm 28 under controlled conditions.

Referring again to FIGS. 2 and 3, it may be observed that a peripherally grooved pin 41 extends laterally from part 34 on arm 28 through a slot 42 in the upper end of a link 43. The lower end 44 of link 43 is pivoted to a U-shaped lever 45, the fulcrum 46 of which is a pin supported on a bracket 47 having a flange 48 extending laterally under the housing 27 for the governor and secured thereto by bolts 49.

The free end 50 of the arm 45 is received in a notch 51 in the armature 52 of a solenoid 53, said free end 50 being pivoted at 54 to armature 52. Solenoid 53 is secured to an upwardly extending plate 55 forming an extension of bracket 47.

Connection is established between link 43 and pin 41 through a spring 56, one end 57 of which is hooked over pin 41 in the groove therein and the other end 58 of which is hooked into an appropriate opening in the head 59 of an adjusting screw 60, the lower end of which passes through an opening in a lateral extension 61 on link 43 and is locked thereto by lock nuts 62 and 63 disposed one on either side of the extension 61. It may be apparent that the tension in spring 56 may be varied by raising or lowering the head 59 of the adjusting screw 60 with respect to the extension 61, and that the tension in spring 56 is transmitted through the pin 41 to lever 25, thus adding the tension of spring 56 to that of spring 32. However, spring 56 will not be in tension unless the free end 50 of the U-shaped arm 45 is firmly held in an elevated position.

When solenoid 53 is energized, armature 52 will be pulled up and held up and hence spring 56 will be put in tension and its force will be impressed upon pin 41 and upon lever 28 to resist movement of the lever by the governor weights 19. Thus, the governor weights 19 will have to rotate at a higher speed for a given movement of the arm 28 and consequently, by appropriate adjustment of the tension in springs 56 and 32, the upper speed of the associated engine by which governor weights 19 are driven may be raised.

Since high engine speed is desired during periods of acceleration, that is, while change speed transmission 12 is adjusted for speed ratios less than the cruising speed ratio, solenoid 53 will be energized during periods of acceleration and de-energized while the vehicle is cruising. The means by which this operation is achieved will now be described.

Adverting to FIG. 1, it may be observed that solenoid 53 has one terminal 64 connected to ground and its other terminal 65 connected to one side of switch 16, the other side of which is connected through an ignition switch 66 to the battery 67 or other source of electric energy for the vehicle. The other side 68 of battery 67 is connected to ground to complete the circuit. Switch 16 is normally closed and hence makes possible the energization of solenoid 53 under all conditions of transmission 12 except that of a shift thereof into its high speed or cruising speed ratio. However, with ignition switch 66 in series with switch 16, even though switch 16 is closed while the vehicle is parked and the engine is not running, solenoid 53 will not be energized until the ignition switch is closed.

It is understood that solenoid 53 may be equipped with a holding coil of known design which requires less energy than the initial energizing coil and hence is substituted for the energizing coil automatically to reduce the drain on battery 67. Drain on the vehicle battery by solenoid 53 may be eliminated entirely by connecting it to the output of the vehicle generator instead of to the battery so that the solenoid is not energized except when the engine is running.

Thus the governor 17 is conditioned for higher engine speeds as long as ignition switch 66 is closed and transmission 12 is conditioned for speed ratios other than its highest ratio corresponding to that at which the vehicle is cruising. When solenoid 53 is energized, its armature 52 is pulled up and held in that position, thereby rocking lever 45 about its pivot 46 in a counterclockwise direction as viewed in FIG. 2 and pulling link 43 downward. The latter action tensions spring 56 and imposes this spring tension upon pin 41 secured to arm 28. The force of spring 56 is thus added to that of spring 32 to hold back arm 28 and its associate fuel feeding control until higher engine and governor speeds are attained. When transmission 12 is conditioned for cruising speed, switch 16 is open and solenoid 53 is de-energized, thereby releasing spring 56 and removing its restraining force from arm 28. With less resistance to overcome, governor weights 19 can swing outwardly at relatively lower speeds of rotation and hence the fuel limiting function of the governor becomes effective at lower engine speeds.

It may be noted that the construction of lever 45 is such that the force of solenoid 53 may be multiplied merely by suitably proportioning the effective lengths of the arms of the lever measured from the axis of pivot 46. Thus a relatively small and inexpensive solenoid will suffice for the above purpose. The forces exerted by the springs 32 and 56 can be adjusted as described by adjusting the positions of the lock nuts 39, 40 and 62, 63.

In some vehicles having an overdrive mechanism and in other vehicles having exceptionally powerful high speed engines it is possible to attain a vehicle speed in excess of the governed speed while in a transmission ratio other than the cruising ratio. Under such operation of the vehicle, the objectives of the governor mechanism would be defeated and hence the arrangement shown in FIG. 4 may be resorted to.

In FIG. 4, there is shown interposed in series between ignition switch 66 and switch 16 a second switch shown generally at 69 having a fixed contact 70 connected by a wire 71 to ignition switch 66 and a movable contact 72 connected by a lead 73 to switch 16. Movable contact 72 is controlled by a centrifugal governor 74 which is driven by gear 75 meshing with the gear (not shown) in transmission 12 which drives the vehicle speedometer. The vehicle speed at which switch 69 is opened is regulated by a spring 76 the compression of which is controlled by a push-pull knob 77 connected through a Bowden wire 77' to a lever 78 arranged to operate a plunger 79. Spring 76 is compressed between movable contact 72 and plunger 79, the degree of compression determining the speed at which governor 74 can overcome the spring.

Knob 77 may be located at some covered and locked place on the vehicle and set at the maximum permissible vehicle speed by an authorized person other than the driver. The opening of the switch 69 performs the same function as the opening of switch 16 with which it is in series.

It is understood that the transmission-operated switch 16 represents merely one of several available locations for the switch and that said switch may be operated in general by any shift device on a vehicle which has a special and unique location or position when the transmission is shifted into its cruising speed ratio.

It is understood that the foregoing description is merely illustrative of a preferred embodiment of the invention and that the scope of the invention is not to be limited thereto but is to be determined by the appended claims.

I claim:

1. A governor mechanism comprising a housing, a rotatable shaft within the housing, pivoted weights driven in timed relation with the shaft, a lever pivoted on the housing and oscillatable about its pivot by the weights, a spring having one end secured to the housing and its other end secured to the lever to restrain movement of the lever and weights, a second lever pivoted externally on the housing at a point removed from the pivot for the first mentioned lever, a link having one end pivoted on the second lever, a laterally extending pin on the first mentioned lever, a slot on the link through which the pin extends, a lateral extension on the link, spring means connected in tension between the pin and extension, and means for releasably holding the second lever against movement about its pivot, whereby to establish a fixed abutment, through said link, to restrain the movement of the first mentioned lever.

2. A governor mechanism as described in claim 1, said extension comprising an apertured lug extending laterally from the link, there being further an adjusting screw received in the aperture, lock-nut means for locking the screw to the lug and to the second mentioned spring means whereby to connect the said second mentioned spring to the extension as aforesaid.

References Cited in the file of this patent

UNITED STATES PATENTS

| | | |
|---|---|---|
| 2,225,206 | Cassels | Dec. 17, 1940 |
| 2,274,609 | Edwards | Feb. 24, 1942 |
| 2,474,316 | May et al. | June 28, 1949 |
| 2,612,965 | Christie | Oct. 7, 1952 |